US011007992B2

(12) United States Patent
Ochsenkuehn

(10) Patent No.: US 11,007,992 B2
(45) Date of Patent: May 18, 2021

(54) AIR-DRYER CARTRIDGE AND HELICAL SPRING FOR AN AIR-DRYER CARTRIDGE

(71) Applicant: KNORR-BREMSE Systeme fuer Nutzfahrzeuge GmbH, Munich (DE)

(72) Inventor: Andreas Ochsenkuehn, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 42 days.

(21) Appl. No.: 16/117,837

(22) Filed: Aug. 30, 2018

(65) Prior Publication Data

US 2018/0370516 A1 Dec. 27, 2018

Related U.S. Application Data

(63) Continuation of application No. PCT/EP2017/054115, filed on Feb. 23, 2017.

(30) Foreign Application Priority Data

Mar. 1, 2016 (DE) ..................... 10 2016 002 385.6

(51) Int. Cl.
*B01D 53/02* (2006.01)
*B60T 17/00* (2006.01)
*B01D 53/04* (2006.01)
*B01D 53/26* (2006.01)

(52) U.S. Cl.
CPC ........ *B60T 17/004* (2013.01); *B01D 53/0407* (2013.01); *B01D 53/261* (2013.01)

(58) Field of Classification Search
CPC .. B01D 53/0407; B01D 53/261; B60T 17/004
See application file for complete search history.

(56) References Cited

U.S. PATENT DOCUMENTS

| 4,487,617 A | 12/1984 | Dienes et al. |
| 5,209,764 A | 5/1993 | Eberling |
| 5,595,588 A | 1/1997 | Blevins |

(Continued)

FOREIGN PATENT DOCUMENTS

| CA | 2 845 555 A1 | 9/2014 |
| CN | 102791550 A | 11/2012 |

(Continued)

OTHER PUBLICATIONS

Translation of WO 95/14598 A1; Knorr-Bremse (Year: 1995).*

(Continued)

*Primary Examiner* — Christopher P Jones
(74) *Attorney, Agent, or Firm* — Crowell & Moring LLP

(57) ABSTRACT

An air-dryer cartridge for a compressed air preparation system of a utility vehicle includes a drying agent container having a first housing part and a second housing part movable relative to each other, a cartridge housing for holding the drying agent container, and a helical spring is arranged to preload the second housing part in a direction to reduce a volume of the drying agent container. The helical spring has multiple coils, including a first outer coil at a first end of the helical spring and a second outer coil at a second end of the helical spring. At least one of the first and second outer coils has a greater diameter than inner coils of the helical spring between the first and the second end of the helical spring.

13 Claims, 6 Drawing Sheets

(56) References Cited

U.S. PATENT DOCUMENTS

| | | | |
|---|---|---|---|
| 5,779,772 A * | 7/1998 | Unger | B60T 17/004 |
| | | | 96/137 |
| 6,730,143 B1 | 5/2004 | Nichols et al. | |
| 7,846,242 B2 * | 12/2010 | Paling | B01D 53/261 |
| | | | 96/134 |
| 8,557,030 B2 | 10/2013 | Fornof et al. | |
| 2004/0094036 A1 | 5/2004 | Nichols et al. | |
| 2007/0144350 A1 * | 6/2007 | Paling | B01D 53/261 |
| | | | 96/134 |
| 2007/0169627 A1 | 7/2007 | Fornof | |
| 2009/0038327 A1 | 2/2009 | Amesoeder et al. | |
| 2012/0118157 A1 | 5/2012 | Eidenschink et al. | |

FOREIGN PATENT DOCUMENTS

| | | |
|---|---|---|
| CN | 203329586 U | 12/2013 |
| DE | 43 39 758 A1 | 5/1995 |
| DE | 197 21 230 A1 | 11/1998 |
| DE | 696 24 245 T2 | 7/2003 |
| EP | 0 036 569 B1 | 10/1982 |
| EP | 0 729 419 B1 | 3/2000 |
| EP | 1 813 491 A2 | 8/2007 |
| EP | 2 448 801 B1 | 8/2014 |
| JP | 60-44022 A | 3/1985 |
| JP | 4-5218 U | 1/1992 |
| JP | 6-510227 A | 11/1994 |
| JP | 2015-515371 A | 5/2015 |
| RU | 2 532 035 C2 | 10/2014 |
| WO | WO 95/14598 A1 | 6/1995 |
| WO | WO 2013/186243 A2 | 12/2013 |

OTHER PUBLICATIONS

Russian-language Office Action issued in counterpart Russian Application No. 2018134057/11(055992) dated Jun. 28, 2019 with English translation (12 pages).

International Search Report (PCT/ISA/210) issued in PCT Application No. PCT/EP2017/054115 dated May 3, 2017 with English translation (seven pages).

German-language Written Opinion (PCT/ISA/237) issued in PCT Application No. PCT/EP2017/054115 dated May 3, 2017 (five pages).

German-language Office Action issued in counterpart German Application No. 10 2016 002 385.6 dated Nov. 3, 2016 (five pages).

Japanese-language Office Action issued in counterpart Japanese Patent Application No. 2018-545925 dated Oct. 7, 2019 with English translation (seven (7) pages).

International Preliminary Report on Patentability (PCT/IB/326 & PCT/IB/373) issued in PCT Application No. PCT/EP2017/054115 dated Sep. 13, 2018, including English translation of document C2 (German-language Written Opinion (PCT/ISA/237) previously filed on Aug. 30, 2018) (six (6) pages).

Chinese-language Office Action issued in Chinese Application No. 201780026932.5 dated May 26, 2020 with English translation (10 pages).

Jianbing T.,"Mechanical Foundation and Structural Design", Chongqing University Press, Feb. 28, 2006 pp. 364-371 (12 pages).

Hindi-language Office Action issued in Indian Application No. 201837032296 dated May 13, 2020 with English translation (seven (7) pages).

* cited by examiner

AIR-DRYER CARTRIDGE AND HELICAL SPRING FOR AN AIR-DRYER CARTRIDGE

CROSS REFERENCE TO RELATED APPLICATIONS

This application is a continuation of PCT International Application No. PCT/EP2017/054115, filed Feb. 23, 2017, which claims priority under 35 U.S.C. § 119 from German Patent Application No. 10 2016 002 385.6, filed Mar. 1, 2016, the entire disclosures of which are herein expressly incorporated by reference.

BACKGROUND AND SUMMARY OF THE INVENTION

The present invention relates to an air-dryer cartridge and to a helical spring for an air-dryer cartridge, in particular for a compressed air preparation system of commercial vehicles.

Air-dryer cartridges of this type are used, for example, in commercial vehicles such as trucks and tractors. Said commercial vehicles typically have one or a plurality of compressed air consumers such as, for example, a pneumatic brake system for the towing vehicle and the trailer, or air suspension systems. These components have to be supplied with compressed air. The compressed air is typically made available by a compressor, for example a reciprocating compressor driven by a drive motor of the vehicle. In order for an interruption-free operation of the compressed air consumers to be guaranteed, the compressed air provided by the compressor usually has to be further prepared. The compressed air in the compressed air preparation systems provided therefore is cleaned of dirt particles which were already present in the suctioned air, and of oil and soot particles which are introduced into the compressed air by the compressor during the compression process. Furthermore, the moisture present in the compressed air is separated. This is required in order to avoid any condensation of the moisture contained in the compressed air in a compressed air container, or to minimize a quantity of condensate being created therein, respectively. The compressed air preparation systems of commercial vehicles for this purpose usually have air-dryer cartridges which dehumidify the compressed air and preferably also receive oil and dirt particles.

Such an air-dryer cartridge as is known from, for example, EP 0 036 569 B1, possesses a drying unit which contains a fill of drying agent/drying agent granulate. This fill that is composed of drying agent is accommodated in a drying agent container which is received in a cartridge housing. The, for example hat-type, cartridge housing has a flange for fastening the air-dryer cartridge onto an air dryer.

The fill of the drying agent herein must be held in a pretensioned state in order for a defined air passage cross-section to be provided. Otherwise, the individual grains of the fill, should the fill be present in loose form in the drying agent container, by virtue of the vibrations arising in the moving operation would rub against one another and, on account thereof, turn to powder. This powder under certain circumstances is so fine that said powder could stop the functioning of the pneumatic brake system of the vehicle at neuralgic points. In order for the drying agent to be kept pretensioned, the drying agent container is constructed from two housing parts which are movable in relation to one another. A spring which pretensions the housing part in a direction for reducing the volume of the drying agent container is disposed between one of the two housing parts and the cartridge housing.

Helical springs having a cylindrical shape have been conventionally used to this end. The spring used herein, with a view to the size thereof, has to exert comparatively high spring forces (e.g. approximately 500 N), on account of which a strong and therefore expensive spring is required. As has already been mentioned, the installed spring is supported on the cartridge housing, more specifically on a part of the cartridge housing that is typically curved in a concave manner. The problem that the spring end that is in contact with the curved part of the cartridge housing has a sharp edge and therefore can push itself into the cartridge housing should the latter not be embodied in a sufficiently stable manner arises herein. The cartridge housing, on account thereof, under certain circumstances can be cold-formed and become brittle.

In order for this problem to be solved, it is known for the sharp edge at the end of the spring to be ground so as to achieve a larger contact face of the spring end with the cartridge housing and to thus improve the introduction of force. In this context, the ground region of the springs however has to be post-machined for the purpose of anti-corrosion protection, this being complex and expensive. As a further solution to the above problem it is known for the free spring end on the side of the curved cartridge housing to be bent toward the radial center of the helical spring, thus in a radially inward manner. However, in the mass production of springs it is possible for only one of the spring ends to be bent radially inward in a cost-effective manner, but not both. In order for the second spring end to also be bent inward, the spring during the production has to be re-clamped, on account of which a higher production complexity is created and the costs for the spring increase. In the case of springs which have only a single radially inward bent end being used, attention has to be paid to the orientation of the spring in the assembly of the air-dryer cartridges, this requiring an increased assembly complexity.

It is an object of the present invention to provide an improved air-dryer cartridge which solves the above problems and nevertheless is producible in a cost-effective manner.

The air-dryer cartridge of the invention has a drying agent container for stocking a drying agent, having a first housing part and a second housing part which are movable relative to one another, and a cartridge housing for receiving the drying agent container. A helical spring pretensions the second housing part in a direction for reducing a volume of the drying agent container. The helical spring has a plurality of coils, wherein a first outer coil at a first end of the helical spring has a larger diameter than inner coils of the helical spring that lie between the first and the second end of the helical spring. A second outer coil at the second end of the helical spring preferably likewise has a larger diameter than inner coils of the helical spring that lie between the first and the second end of the helical spring.

The air-dryer cartridge has a cartridge housing in which a drying agent container for stocking a drying agent is disposed. The drying agent is preferably a drying agent granulate which is present in loose form in the drying agent container. The drying agent container has a first housing part which is designed so as to be substantially cylindrical, for example, and a second housing part which is designed as a drying agent cover, or a granulate cover, respectively, said cover being inserted so as to be movable in an opening of the first housing part. The drying agent cover in the first housing part of the drying agent container is preferably guided in an axial manner. By exerting a force by means of a helical spring on the second housing part, the drying agent (granulate) that is located in the drying agent container is held by way of a defined pretensioning such that a defined air passage cross section can be guaranteed in the drying agent container. The helical spring in the installed state herein is supported on the second housing part of the drying agent container, on the one hand, and on the cartridge housing, for example, or on an additional cover between the cartridge housing and the drying agent container, on the other hand, in such a manner that said helical spring in the installed state is compressed.

It is proposed according to the invention for the helical spring to be designed such that a first outer coil at a first end of the helical spring, and/or a second outer coil at a second end of the helical spring, have/has in each case a larger diameter than inner coils of the helical spring that lie between the first and the second end of the helical spring. That is to say that the helical spring at an end thereof preferably has a first outer coil having a larger diameter than the coil which is adjacent to said coil, and/or at another end thereof has a second outer coil having a larger diameter than the diameter of the coil adjacent thereto. This configuration can be referred to as a "helical spring having outboard ends". However, according to the invention not all inner coils of the helical spring necessarily have to have a smaller diameter than the first outer coil, or the second outer coil, respectively. The term diameter here refers selectively to the external diameter or to the internal diameter of the coils of the helical spring; the wire diameter of the helical spring is substantially consistent across all coils.

On account of this design embodiment of the helical springs having outboard ends it is possible for the helical spring in the installed state to bear on the cartridge housing, for example, across a large as possible coil length, such that an improved distribution of forces can be achieved. This distribution of forces in the case of the helical spring being supported in relation to a face that is curved away from the drying agent container (that is to say curved in a concave outward manner) is even better. The outer coil, that is to say the outboard free end of the helical spring, can freely adapt to the shaping of the cartridge housing, for example, without being prevented therefrom by a coil of the helical spring adjacent to said outer coil. It can be prevented on account of this configuration that the edge at the end of this outer coil of the helical spring, more specifically the edge between the shelf face and the end face of the helical spring, is pushed into the cartridge housing, for example. As a result, the cartridge housing, for example, is stressed to a lesser extent and can be embodied using a thinner material thickness, on account of which weight and costs can be saved.

A further advantage of the air-dryer cartridge according to the invention is derived in that the central coils of the spring have a smaller diameter than the outer coils. On account thereof, the helical spring can be embodied using a thinner wire thickness, on account of which material and thus production costs can be saved.

In one advantageous design embodiment of the invention the first outer coil and the second outer coil of the helical spring have mutually identical geometries. In this way, the helical spring is designed so as to be symmetrical. The orientation in which the helical spring is installed in the assembly of the air-dryer cartridge is irrelevant on account of this measure. As a result, the assembly is simplified and capable of being carried out in a more cost-effective manner, wherein assembly errors can be simultaneously avoided.

In one advantageous design embodiment of the invention the helical spring is supported against a face that is curved in a direction away from the drying agent container. The distribution of forces can advantageously be even further improved in that the free ends of the helical spring are embodied with an even larger diameter the more intensively the cartridge housing is curved, for example.

In one further advantageous design embodiment of the invention the first outer coil of the helical spring in the installed state of the helical spring is spaced apart from an inner coil of the helical spring that is adjacent to said first outer coil (that is to say said first outer coil does not bear on said adjacent inner coil and preferably does not contact the latter). Alternatively or additionally, the second outer coil of the helical spring in the installed state of the helical spring is also preferably spaced apart from an inner coil of the helical spring that is adjacent to said second outer coil (that is to say said outer coil preferably does not bear on said inner coil and preferably does not contact the latter).

In the non-installed state of the helical spring an internal diameter of the first outer coil at the outer end thereof is preferably larger by less than a wire diameter size of the helical spring than an external diameter of the inner coil that is adjacent to the first outer coil, or an internal diameter of the second outer coil at the outer end thereof is larger by less than a wire diameter size of the helical spring than an external diameter of the inner coil that is adjacent to the second outer coil, respectively. This radial spacing preferably is at maximum approximately 75% of the wire diameter, more preferably at maximum approximately 50% of the wire diameter. This delimitation of the radial spacing according to the invention should apply at least at the outer end of the first or of the second coil, respectively, of the helical spring, that is to say not necessarily across the entire outer coil. It can be guaranteed on account of this measure that helical springs do not catch on or thread into one another in the manufacturing process, which would lead to delays in the assembly process of the air-dryer cartridge. On the other hand, this radial spacing is preferably at least approximately 15% of the wire diameter, or at least approximately 0.5 mm, in order to avoid any contact between the mutually adjacent coils of the helical spring. Damage to the surface coating can be prevented on account of this measure.

In one further advantageous design embodiment of the invention the helical spring is supported by way of at least 1.2 coils, more preferably at least 1.4 coils, even more preferably at least 1.5 coils. That is to say, preferably not only the outer end of the outer coil of the helical spring bears on the cartridge housing, for example, but apart from the entire first outer coil also a part of the subsequent inner coil. The introduction of force from the helical spring into the cartridge housing, for example, can be further improved on account thereof.

In one advantageous design embodiment of the invention at least one part of the inner coils of the helical spring forms a cylindrical portion of the helical spring. A helical spring designed in such a manner advantageously has a lower tendency of kinking than a pure dual-cone spring, for example.

In one further advantageous design embodiment of the invention at least one guide element for positioning the helical spring is provided on the second housing part of the drying agent container. This at least one guide element preferably has an inner guide element which in the installed state of the helical spring protrudes into the helical spring up to at least one inner coil of the helical spring. On account of the at least one guide element, the positioning of the helical spring in the assembly of the air-dryer cartridge can be simplified, and maintaining the correct position of the helical spring in the installed state can be supported. The inner guide element is advantageous in particular in combination with a central cylindrical portion of the helical spring, said central cylindrical portion being able to be centered on the inner guide element, for example. The inner guide element in the installed state of the helical spring in this instance preferably protrudes into the helical spring by at least one inner coil of the cylindrical portion of said helical spring. The inner guide element in the installed state of the helical spring preferably protrudes into the helical spring by at least one quarter, preferably at least one third, of the height of the helical spring. Moreover, providing the guide elements on the second housing part of the drying agent container is advantageous since this design embodiment can be embodied in a more cost effective manner than attaching guide elements to an inner side of the cartridge housing, for example, as an alternative.

In yet one further advantageous design embodiment of the invention a wire of the helical spring across the entire length thereof has a substantially circular cross section. In other words, grinding the spring ends, as is the case in the use of conventional helical springs, can be dispensed with since the helical spring designed according to the invention achieves a maximum bearing face of the outer coil on the cartridge housing, for example, already without grinding. The manufacturing complexity can thus be minimized, and a final coating of the spring ends for the purpose of an anti-corrosion protection can be dispensed with. According to the invention, a coated wire can preferably be wound to form the helical spring without the spring ends of the latter having to be ground and without any subsequent coating being required. For the purpose of anti-corrosion protection, a coated wire is preferably used for the helical spring; the use of non-coated wires for the production of the helical spring is also conceivable in other embodiments.

In one advantageous design embodiment of the invention the drying agent container is surrounded directly by the cartridge housing, and the helical spring is supported on the second housing part of the drying agent container, on the one hand, and on the cartridge housing, on the other hand. The helical spring is preferably supported on an outwardly curved cover portion of the cartridge housing.

In one other advantageous embodiment of the invention a cover which is fastened so as to be immovable relative to the first housing part of the drying agent container is disposed between the drying agent container and the cartridge housing. The helical spring in this instance is preferably supported on the second housing part of the drying agent container, on the one hand, and on said cover, on the other hand. In the case of this embodiment, not the entire air-dryer cartridge has to be replaced but only the inner unit without the cartridge housing. The cover is preferably attached to the first housing part of the drying agent container by way of a snap-fit connection.

A helical spring for an air-dryer cartridge of the invention as described above is also the subject matter of the invention.

The invention can be particularly advantageously applied in air-dryer cartridges for compressed air preparation systems of commercial vehicles.

Other objects, advantages and novel features of the present invention will become apparent from the following detailed description of one or more preferred embodiments when considered in conjunction with the accompanying drawings.

DETAILED DESCRIPTION OF THE DRAWINGS

In order for the present invention to be better understood, the construction of a conventional air-dryer cartridge will first be explained in an exemplary manner.

Figure 1:
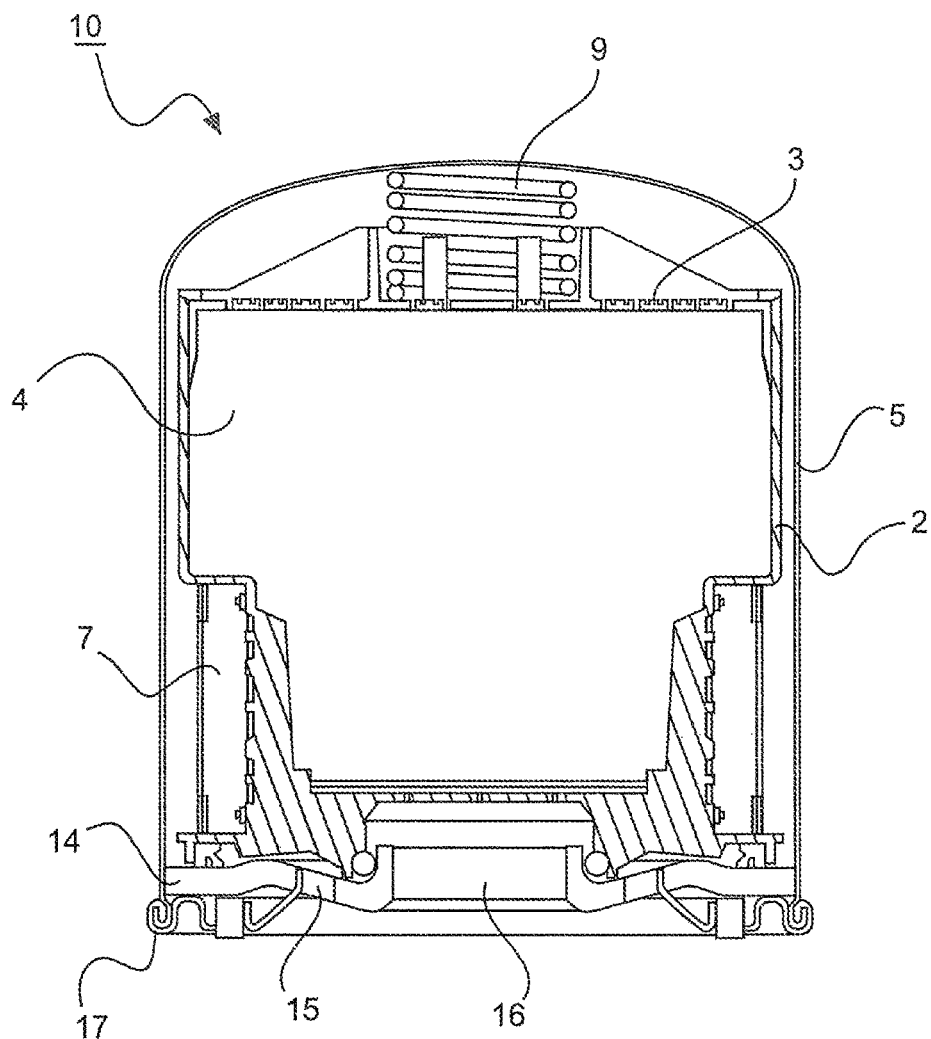
FIG. 1 shows a sectional view of a conventional air-dryer cartridge.
Figure 2:
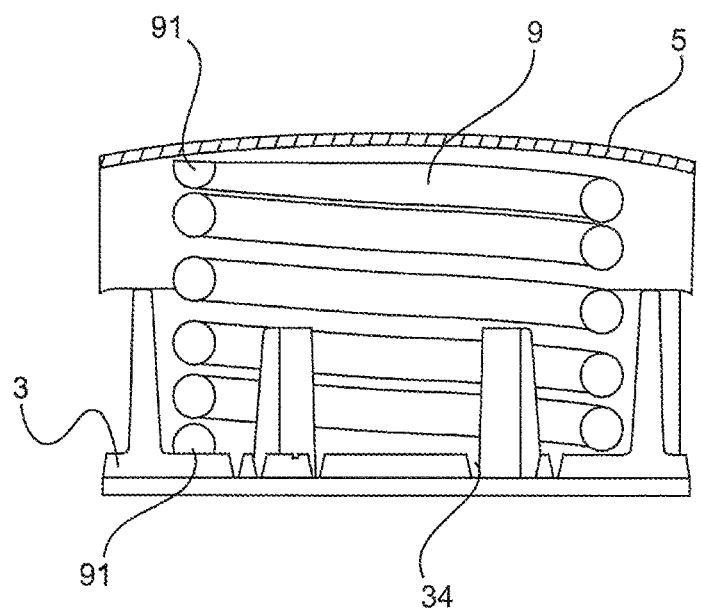
FIG. 2 shows an enlarged detailed view of the air-dryer cartridge of FIG. 1.

FIG. 1 shows the construction of the conventional air-dryer cartridge 10, and FIG. 2 shows the helical spring 9 used in said air-dryer cartridge 10 in more detail.

The air-dryer cartridge 10 typically has a cartridge housing 5 having a closed housing cover and a flange 14 having at least one air inlet 15 and one air outlet 16. A drying agent container which is at least partially filled with a drying agent (granulate) 4 and which has a first housing part 2 having a plurality of air-flow openings and a second housing part 3, designed as a granulate cover, having a plurality of air-flow openings 34 is disposed in the cartridge housing 5. The flange 14 is attached to the cartridge housing 5 by means of a base plate 17, wherein the base plate 17 in the configuration visualized in FIG. 1 is connected to the cartridge housing 5 by way of a flanged seam. In order for the air-dryer cartridge 10 to be assembled on an air-dryer housing, the flange 14 on the cartridge neck thereof having the air outlet 16 is provided with an internal thread by way of which the air-dryer cartridge 10 can be screwed onto the air-dryer housing.

At least one filter element 7 which in the embodiment of FIG. 1 is perfused in the radial direction of the drying agent container by the compressed air that enters the air-dryer cartridge 10 by way of the air inlet 15 is disposed between the flange 14 and the first housing part 2 of the drying agent container. After filtration, the compressed air flows upward through the intermediate space between the cartridge housing 5 and the first housing part 2 of the drying agent container and by way of the air-flow openings 34 in the second housing part 3 reaches the interior of the drying agent container. After perfusing the drying agent 4, the de-humidified compressed air exits the air-dryer cartridge 10 by way of the air-flow openings in the first housing part 2 and the air outlet 16.

The second housing part 3 is designed as a drying agent cover which is inserted so as to be movable (in the upward/downward direction in FIG. 1) into a container opening 6 of the first housing part 2. The drying agent (granulate) 4 is held under a defined pretensioning so that a defined air passage cross section is maintained in the drying agent container over the service life of the air-dryer cartridge 10. A helical spring 9 which is supported on the second housing part 3 of the drying agent container, on the one hand, and on the curved housing cover of the cartridge housing 5, on the other hand, is disposed between the cartridge housing 5 and the drying agent container.

As is illustrated in FIGS. 1 and 2, a substantially cylindrical helical screw 9 having a plurality of coils of identical diameter is usually used in conventional air-dryer cartridges 10. In order for the bearing face between the helical spring 9 and the cartridge housing 5 to be enlarged, the helical screw 9 is provided with ground ends 91, as can be seen in particular in FIG. 2. Pushing in a sharp edge at the end of the helical spring 9 into the cartridge housing 5 is to be prevented in this way. The ground ends 91 of the helical spring 9 are usually provided with a coating for the purpose of anti-corrosion protection.

Figure 3:
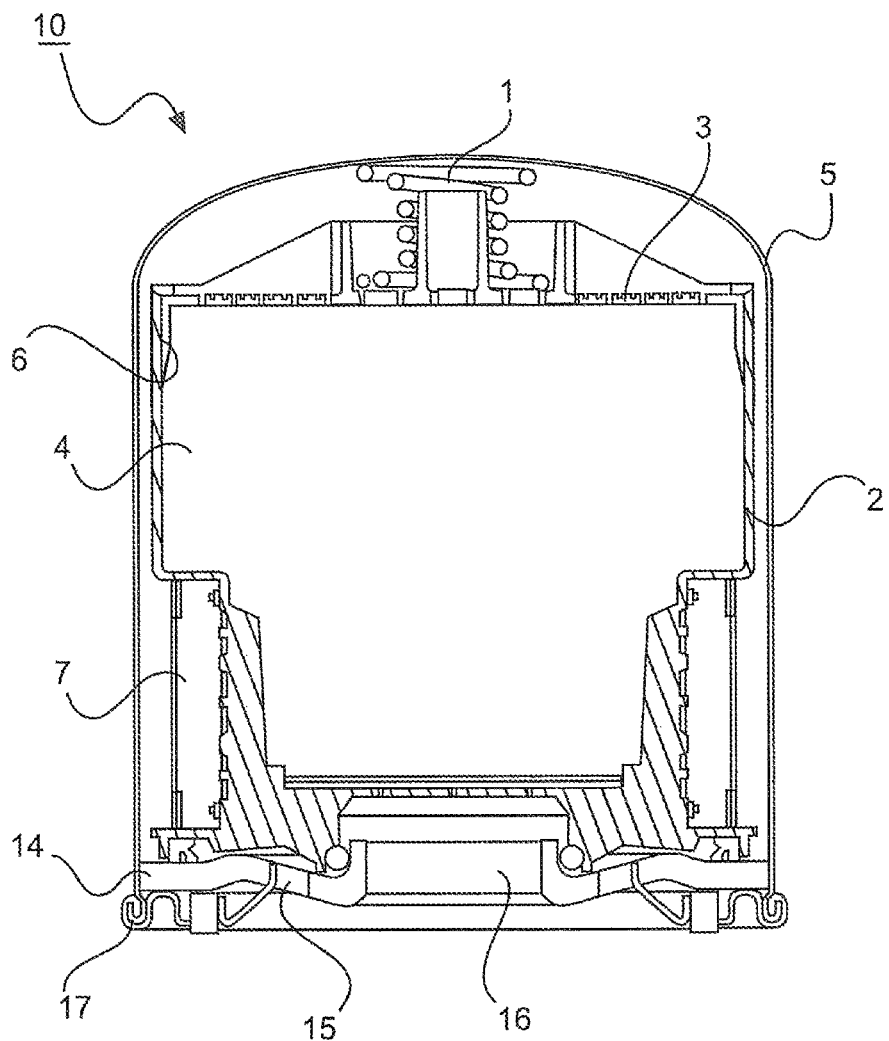
FIG. 3 shows a sectional view of an air-dryer cartridge according to a first embodiment of the invention.
Figure 4:
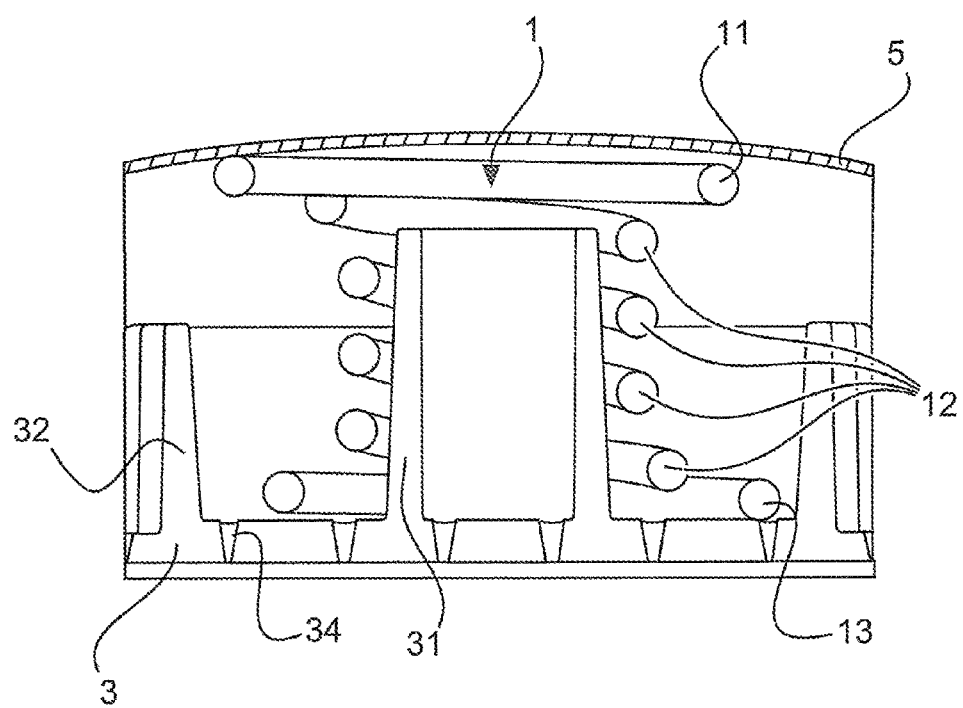
FIG. 4 shows an enlarged detailed view of the air-dryer cartridge of FIG. 3.

FIGS. 3 and 4 show the construction of an air-dryer cartridge according to a first embodiment of the invention.

The air-dryer cartridge of FIGS. 3 and 4 differs from the conventional air-dryer cartridge shown in FIGS. 1 and 2 by way of the design embodiment of the helical spring for the defined pretensioning of the drying agent in the drying agent container. The construction and the functional mode of the air-dryer cartridge according to the invention otherwise correspond to that of the conventional air-dryer cartridge described above.

In particular, the air-dryer cartridge 10 of this embodiment has a cartridge housing 5 having a flange 14 and a base plate 17, as well as a drying agent container, formed from a first housing part 2 and from a second housing part 3, for receiving a drying agent (granulate) 4. The second housing part 3 serves as a drying agent cover and is inserted in the container opening 6 of the first housing part 2 so as to be movable relative to the first housing part 2. As can be seen in particular in FIG. 4, the second housing part 3 is provided with a multiplicity of air-flow openings 34 through which the compressed air, after perfusing the filter element 7, can make its way into the interior of the drying agent container so as to be de-humidified by the drying agent 4 contained in said drying agent container.

Moreover, a plurality of guide elements are configured on the second housing part 3. In the present embodiment, an inner guide element 31 which is disposed so as to be centric and which is designed, for example, as a substantially cylindrical mandrel is provided. Moreover, an annular outer guide element 32 which is disposed so as to be substantially coaxial with the inner guide element 31 is provided in the present embodiment. These guide elements 31, 32 serve the positioning of the helical spring 1 in the assembly of the air-dryer cartridge 10 and for holding the helical spring 1 in the correct position thereof over the service life of the air-dryer cartridge 10. The guide elements can also be dispensed with, only the inner guide element 31 can be provided, or only the outer guide element 32 can be provided in other embodiments of the invention.

The cartridge housing 5 and the first housing part 2 of the drying agent container are disposed so as to be immovable relative to one another, while the second housing part 3 of the drying agent container is movable relative to the first housing part 2 and also relative to the cartridge housing 5. The drying agent 4 in the drying agent container can thus be held under a defined pretensioning by means of the helical spring 1, wherein the helical spring 1 is supported between the second housing part 3 of the drying agent container and the outwardly curved housing cover of the cartridge housing 5.

As opposed to conventional air-dryer cartridges, the helical spring 1 of the air-dryer cartridge 10 according to the invention does not have a purely cylindrical design. As is illustrated in particular in FIG. 4, the helical spring 1 at the first end thereof (upper end in FIGS. 3 and 4) has a first outer coil 11, and at the second end thereof (lower end in FIGS. 3 and 4) has a second outer coil 13. A plurality of inner coils 12 lie therebetween.

The outer coils 11, 13 of the helical spring 1 have in each case a diameter which is larger than the diameter of the inner coils 12. The helical spring 1 in FIG. 4 is shown in the installed compressed state of said helical spring 1. By virtue of the difference in diameter of the coils, it is possible for the second outer coil 13 to move upward while being compressed, without impacting on the inner coil 12 that is adjacent to said second outer coil 13. Likewise, it is possible for the first outer coil 11 to move somewhat downward while being compressed, without impacting on the inner coil 12 that is adjacent to said first outer coil 11. The first outer coil 11 can thus bear across a large area on the concave internal contour of the cartridge housing 5 without herein contacting the inner coil 12 that is adjacent to said first outer coil 11.

The first and the second outer coil 11, 13 herein preferably have only a minor spacing from the inner coils 12 that are adjacent to said first and said second outer coil 11, 13, such that helical springs do not catch on or thread into one another in the manufacturing process. Depending on the wire diameter of the helical spring, said spacing in the non-installed state of the helical spring 1 is in the range of, for example, approximately 0.5 mm to approximately 1.5 mm. This radial spacing between the mutually adjacent coils is generally at maximum, for example, approximately 50% of the wire diameter and at least approximately 15% of the wire diameter. The delimitation of the radial spacing between the coils is a must in particular in the region of the spring end of the helical spring 1 and is not required across the entire outer coil 11, 13.

In terms of an improved distribution of forces from the helical spring 1 to the cartridge housing 5 it is advantageous in this context for the helical spring 1 to bear on the housing cover of the cartridge housing 5 by way of approximately 1.5 coils, for example.

On account of the positive distribution of forces of the helical spring 1 to the cartridge housing 5 the cartridge housing 5 as compared to the conventional construction can be embodied having a purely cylindrical helical spring 9 having a thinner wall thickness. This leads to savings in terms of material and a reduction in weight.

Furthermore, the geometries of the two outer coils 11, 13 and of the inner coils 12 are substantially symmetrical. This means that the helical spring 1 illustrated in FIG. 4 can also be installed in a reversed orientation, that is to say "upside down", the functionality being identical.

Furthermore, the helical spring 1 according to the invention does not have any ground ends. The increased manufacturing complexity which would be required for the production of a helical spring 9, shown in FIGS. 1 and 2, of a conventional air-dryer cartridge 10 is thus dispensed with. A non-coated wire which is wound to form the helical spring and the spring ends of the outer coils of which are ground, upon which the wire of the helical spring has to be coated for the purpose of anti-corrosion protection is usually used for the helical spring 9 of the conventional air-dryer cartridge 10. As opposed therefor, a coated wire can be used and wound directly for the helical spring 1 of the air-dryer cartridge 10 according to the invention, such that the additional manufacturing steps of grinding and coating are dispensed with.

In order for the guiding function of the inner guide element 31 of the second housing part 3 to be supported, at least one part of the inner coils 12 forms a substantially cylindrical portion. Apart from the improved positional guiding for the helical spring 1, this design embodiment also results in a kinking tendency of the helical spring 1 that is reduced as compared to pure dual-cone springs. The inner guide element 31 in the installed state of the helical spring 1 preferably protrudes into this helical spring 1 by way of at least one full inner coil 12 of the cylindrical portion of the helical spring 1. The inner guide element 31 in the exemplary embodiment shown protrudes into the helical spring 1 by way of more than half the height of the helical spring 1. The inner guide element 31 likewise reduces the kinking risk of the helical spring 1.

By virtue of the smaller diameter of the inner coils 12, a helical spring 1 having a wire thickness that is thinner as compared to the conventional cylindrical helical spring 9 of FIGS. 1 and 2, without the spring force of said helical spring 1 being reduced. As a result, material and weight can be saved.

In a tested embodiment of the invention the height of the helical spring 1 in the non-installed state was approximately 55 mm, the external diameter of the outer coils 11, 13 of the helical spring were at maximum approximately 41 mm, the internal diameter of the inner coils 12 was approximately 17 mm, and approximately 2.5 cylindrical inner coils 12 were present.

In another embodiment of the invention (not illustrated) the helical spring 1 has only one first outer coil 11 having an enlarged diameter, while the second outer coil 13 has substantially the same diameter as the inner coils 12.

Figure 5:
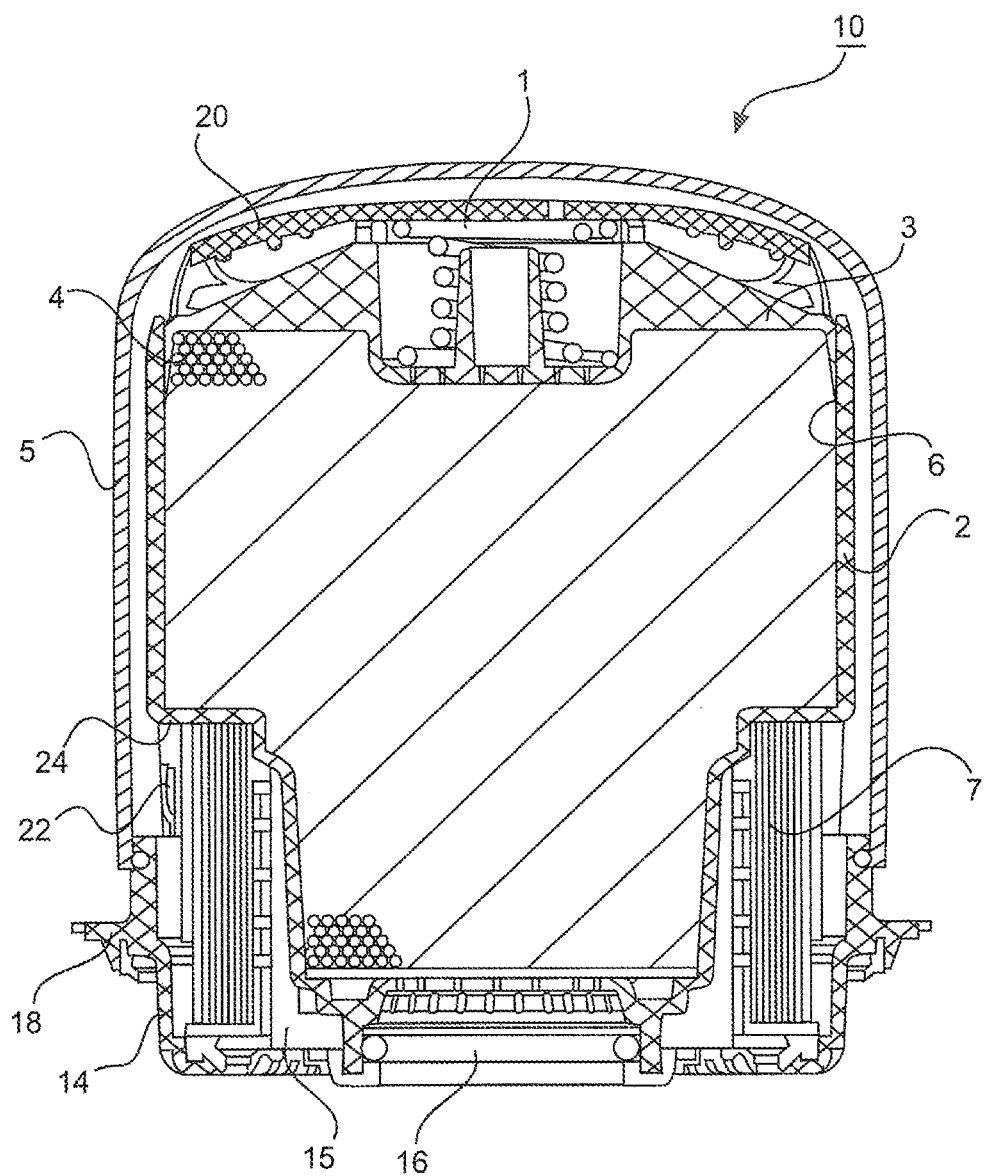
FIG. 5 shows a sectional view of an air-dryer cartridge according to a second embodiment of the invention.
Figure 6:
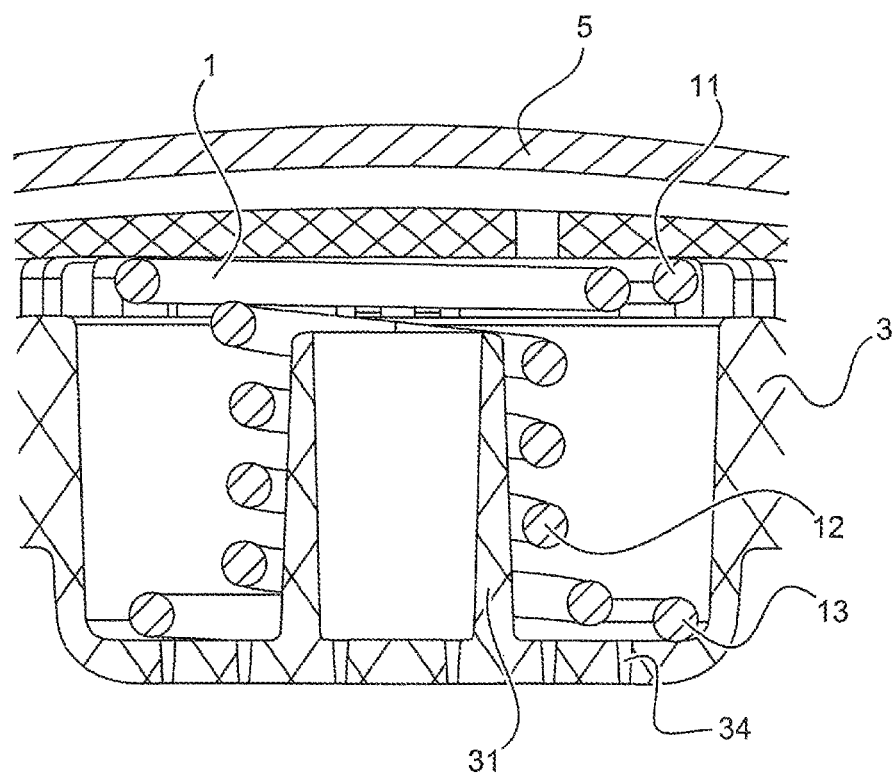
FIG. 6 shows an enlarged detailed view of the air-dryer cartridge of FIG. 5.

FIGS. 5 and 6 show the construction of an air-dryer cartridge according to a second embodiment of the invention.

The air-dryer cartridge 10 of this second embodiment differs from that of the first embodiment in particular by way of the design embodiment of the cartridge housing and the assembly of the latter on an air-dryer housing.

In particular, the air-dryer cartridge 10 of this embodiment has a cartridge housing 5 that is releasably fastened, for example snap-fitted, to a flange 14 having a bayonet protrusion 18, and has a drying agent container, formed from a first housing part 2 and from a second housing part 3, for receiving a drying agent (granulate) 4. The second housing part 3 serves as a drying agent cover and is inserted in the container opening 6 of the first housing part 2 so as to be movable relative to the first housing part 2. As can be seen in particular in FIG. 6, the second housing part 3 is provided with a multiplicity of air-flow openings 34 through which the compressed air after perfusing the filter element 7 can make its way into the interior of the drying agent container so as to be de-humidified by the drying agent 4 contained in said drying agent container.

An inner guide element 31 which is disposed so as to be centric and which is designed as a substantially cylindrical mandrel, for example, is provided on the second housing part 3. This inner guide element 31 serves for positioning the helical spring 1 in the assembly of the air-dryer cartridge 10 and for holding the helical spring 1 in the correct position thereof over the service life of the air-dryer cartridge 10. The guide element can also be dispensed with in other embodiments of the invention.

An additional cover 20 is disposed between the cover portion of the cartridge housing 5 and the drying agent container. This cover 20 is fixedly connected to the first housing part 2 of the drying agent container. This connection is preferably designed as a snap-fit connection which comprises first connection elements 22 on the cover 20 and second connection elements 24 on the first housing part 2 of the drying. For example, the first connection elements 22 can be designed as belts which are guided from the cover 20 around the drying agent container and in the manner of a tie rod engage behind a second connection element 24 that is designed as a protrusion on the first housing part 2 of the drying agent container.

The cover 20 within the cartridge housing 5 and the first housing part 2 of the drying agent container are thus disposed so as to be immovable relative to one another, while the second housing part 3 of the drying agent container is movable relative to the first housing part 2 and also relative to the cover 20. The drying agent 4 in the drying agent container can thus be held under a defined pretensioning by means of the helical spring 1, wherein the helical spring 1 is supported between the second housing part 3 of the drying agent container and the outwardly curved cover 20.

This construction mode of the air-dryer cartridge 10, with the exception of in particular the helical spring 1 designed according to the invention, is in principle known from, for example, EP 2 448 801 B1, to the entire contents of which in terms of the construction and functional mode reference is hereby made.

The helical spring 1 of the air-dryer cartridge 10 of this embodiment is configured in a manner analogous to that of the first embodiment of FIGS. 3 and 4.

On account of the positive distribution of forces of the helical spring 1 to the cover 20, said cover 20 as compared to the conventional construction can be embodied by way of a purely cylindrical helical spring 9 having a thinner wall thickness. This leads to a saving in terms of material and a reduction in weight.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Helical spring (according to the invention)
2 First housing part of the drying agent container
3 Second housing part of the drying agent container, in particular drying agent cover, or granulate cover, respectively
4 Drying agent, in particular drying agent granulate
5 Cartridge housing
6 Container opening
7 Filter element
9 Helical spring (according to the prior art)
10 Air-dryer cartridge
11 First outer coil
12 Inner coils
13 Second outer coil
14 Flange
15 Inlet opening
16 Outlet opening
17 Base plate
18 Bayonet protrusion
20 Cover
22 First connection element on 20
24 Second connection element on 2
31 Inner guide element, in particular mandrel
32 Outer guide element
34 Air-flow openings
91 Ground ends of 9

What is claimed is:

1. An air-dryer cartridge for a compressed air preparation system of a commercial vehicle, comprising:
a drying agent container configured to hold a drying agent, the drying agent container including a first housing part and a second housing part movable relative to one another;
a cartridge housing configured to receive the drying agent container; and
a helical spring having a plurality of coils, the helical spring being configured to pretension the second housing part relative to the first housing part in a direction which minimizes a volume of the drying agent container,
wherein
a first outer coil at a first end of the helical spring has a larger diameter than inner coils of the helical spring between the first and a second end of the helical spring such that at least a portion of at least one of the inner coils is in contact with the first housing part or the second housing part when the helical spring is in an installed position, and
the second housing part of the drying agent container includes at least one guide element configured to guide the helical spring, the at least one guide element located concentrically within the helical spring and having an axial height at least one-half of an axial height of the helical spring in an installed position.

2. The air-dryer cartridge as claimed in claim 1, wherein a second outer coil at the second end of the helical spring has a larger diameter than the inner coils of the helical spring.

3. The air-dryer cartridge as claimed in claim 2, wherein the first outer coil and the second outer coil of the helical spring are geometrically the same.

4. The air-dryer cartridge as claimed in claim 1, wherein the helical spring is supported against a surface that is curved in a direction away from the drying agent container.

5. The air-dryer cartridge as claimed in 2, wherein one or more of the first outer coil of the helical spring in an installed state of the helical spring is spaced apart from a first adjacent one of the inner coils, and the second outer coil of the helical spring in the installed state of the helical spring is spaced apart from a second adjacent one of the inner coils.

6. The air-dryer cartridge as claimed in claim 5, wherein in an non-installed state of the helical spring, one or more of an internal diameter of the first outer coil is larger by less than a wire diameter size of the helical spring than an external diameter of the first adjacent inner coil, and an internal diameter of the second outer coil is larger by less than the wire diameter size of the helical spring than an external diameter of the second adjacent inner coil.

7. The air-dryer cartridge as claimed in claim 1, wherein the helical spring on a side facing away from the second housing part of the drying agent container is supported by at least 1.2 coils.

8. The air-dryer cartridge as claimed in claim 7, wherein the helical spring on a side facing away from the second housing part of the drying agent container is supported by at least 1.4 coils.

9. The air-dryer cartridge as claimed in claim 1, wherein at least one part of the inner coils of the helical spring forms a cylindrical portion of the helical spring.

10. The air-dryer cartridge as claimed in claim 1, wherein a wire of the helical spring has a substantially circular cross section.

11. The air-dryer cartridge as claimed in claim 1, wherein the first end of the helical spring is supported on one of the second housing part of the drying agent container and the cartridge housing, and the second end of the helical spring is supported on the other of the second housing part of the drying agent container and the cartridge housing.

12. The air-dryer cartridge as claimed in claim 1, further comprising:
a cover disposed between the drying agent container and the cartridge housing such that the cover is immovable relative to the first housing part of the drying agent container; and
the helical spring is supported on the second housing part of the drying agent container and on the cover.

13. A helical spring for an air-dryer cartridge having a drying agent container configured to hold a drying agent with a first housing part and a second housing part movable relative to one another, and a cartridge housing configured to receive the drying agent container, comprising:
a helical spring having a plurality of coils, the helical spring being configured to pretension the second housing part relative to the first housing part in a direction which minimizes a volume of the drying agent container,
wherein
one or more of a first outer coil at a first end of the helical spring and a second outer coil at a second end of the helical spring has in a larger diameter than at least one inner coil of the helical spring between the first and the second ends of the helical spring such that at least a portion of at least one of the inner coils is in contact with the first housing part or
the second housing part when the helical spring is in an installed position, and the helical spring is configured to be guided by at least one guide element of the second housing part concentrically within the helical spring and having an axial height at least one-half of an axial height of the helical spring in an installed position.

* * * * *